(12) United States Patent
Chang et al.

(10) Patent No.: US 7,711,943 B2
(45) Date of Patent: May 4, 2010

(54) COMPUTER AND METHOD FOR SAVING ELECTRICITY CONSUMED THEREBY

(75) Inventors: An-Sheng Chang, Taipei (TW); Chia-Ho Lin, Taipei (TW)

(73) Assignee: Giga-Byte Technology Co., Ltd., Taipei (TW)

( * ) Notice: Subject to any disclaimer, the term of this patent is extended or adjusted under 35 U.S.C. 154(b) by 864 days.

(21) Appl. No.: 11/508,979

(22) Filed: Aug. 24, 2006

(65) Prior Publication Data

US 2007/0288098 A1    Dec. 13, 2007

(30) Foreign Application Priority Data

Jun. 2, 2006    (TW) ............... 95119761 A

(51) Int. Cl.
*G06F 1/32*    (2006.01)
*G06F 15/177*    (2006.01)
(52) U.S. Cl. ............... 713/2; 713/100; 713/324
(58) Field of Classification Search ............... 713/1, 713/2, 100, 324
See application file for complete search history.

(56) References Cited

U.S. PATENT DOCUMENTS

| 5,579,524 A | 11/1996 | Kikinis |
| 5,838,983 A | 11/1998 | Atkinson |
| 5,978,923 A | 11/1999 | Kou |
| 2002/0162444 A1 | 11/2002 | Yu et al. |
| 2003/0135769 A1 | 7/2003 | Loughran |
| 2003/0188144 A1* | 10/2003 | Du et al. ............ 713/1 |
| 2004/0006690 A1 | 1/2004 | Du et al. |
| 2004/0205396 A1* | 10/2004 | Wu et al. ............ 714/23 |
| 2005/0204181 A1* | 9/2005 | Montero et al. ......... 714/4 |
| 2006/0248363 A1* | 11/2006 | Chen et al. ........... 713/300 |
| 2007/0028132 A1* | 2/2007 | Wang ............... 713/323 |

FOREIGN PATENT DOCUMENTS

| JP | 2002-14872 | 1/2002 |
| JP | 2004-227291 | 8/2004 |
| WO | 01/15159 | 3/2001 |
| WO | 03/083694 | 10/2003 |
| WO | 2004/012060 | 2/2004 |
| WO | 2005/029300 | 3/2005 |

\* cited by examiner

*Primary Examiner*—Dennis M Butler
(74) *Attorney, Agent, or Firm*—Rosenberg, Klein & Lee

(57) ABSTRACT

Disclosed is a method for saving electricity consumed by a computer. The method includes the steps of defining a plurality of items of service so that a user can select one of the items of service, identifying at least one device, driver and application corresponding to the selected item of service and providing a simplified process for actuating the device, driver and application corresponding to the selected item of service.

10 Claims, 6 Drawing Sheets

| service | applications | peripherals and drivers | | operation modes of the central process device |
| --- | --- | --- | --- | --- |
| | | actuated | turned off | |
| music | multi-media program | PS/2 keyboard<br>PS/2 mouse<br>first IDE hard disc<br>first video card<br>sound effect card<br>first USB port | second IDE hard disc<br>second video card<br>first network card<br>second network card<br>second-eighth USB ports<br>floppy disc<br>first and second serial ports<br>parallel port<br>first-fourth SATA discs | low-speed mode |
| karaoke | multi-media program | PS/2 keyboard<br>PS/2 mouse<br>first IDE hard disc<br>second IDE hard disc<br>first video card<br>sound effect card | second video card<br>first network card<br>second network card<br>first-eighth USB ports<br>floppy disc<br>first and second serial ports<br>parallel port<br>first-fourth SATA discs | high-speed mode |
| web-browsing | web browser | PS/2 keyboard<br>PS/2 mouse<br>first IDE hard disc<br>first video card<br>sound effect card<br>first network card | second IDE hard disc<br>second video card<br>first network card<br>second network card<br>second-eighth USB ports<br>floppy disc<br>first and second serial ports<br>parallel port<br>first-fourth SATA discs | medium-speed mode |

FIG. 3

COMPUTER AND METHOD FOR SAVING ELECTRICITY CONSUMED THEREBY

BACKGROUND OF INVENTION

1. Field of Invention

The present invention relates to a computer and, more particularly, to a method for saving electricity consumed by a computer.

2. Related Prior Art

Traditionally, a computer cannot immediately provide any service to a user after it is turned on. Only after the loading of an operating system is completed can the computer provide service such as TV, radio, games, internet browsing, web phone, emails, music and movies. One problem is that a lot of time elapses before the loading of the operating system is completed. Another problem is that a lot of electricity is consumed during the executing of the operating system.

There have been techniques based on changes in software and/or hardware to enable a computer, when turned on or before the loading of an operating system, to provide a single item of service. The single item of service may be music or movies. However, each of these techniques cannot cause the computer to provide a plurality of items of service.

Disclosed in Patent Application Publication US20040006690 is a computer that executes a first operating system or a second operating system. As required, the second operating system executes an application selected from a DVD application, a TV application, a digital device application, a remote control application, a voice-recording application and an audio application. This technique discloses the provision of several applications, but fails to mention how to enable a user to choose from the applications. Moreover, during the executing of the second operating system, the devices of the computer irrelevant to a chosen application also consume electricity, and this is a waste.

Therefore, the present invention is intended to obviate or at least alleviate the problems encountered in prior art.

SUMMARY OF INVENTION

It is an objective of the present invention to provide a method for enabling a computer to provide a plurality of items of service so that a user can select one of the items of service to execute at least one application corresponding to the selected item of service only, to turn on at least one device corresponding to the selected item of service only, and to turn off devices that are irrelevant to the selected item of service. Thus, the computer provides service corresponding to the selected item of service while consuming a reduced amount of electricity.

According to the present invention, a method for saving electricity consumed by a computer includes the steps of defining a plurality of items of service so that a user can select one of the items of service, identifying at least one device, driver and application corresponding to the selected item of service and providing a simplified process for actuating the device, driver and application corresponding to the selected item of service.

In an aspect, the simplified process includes the steps of executing the basic input and out system (hereinafter referred to as "BIOS") of the computer, turning on all of the devices of the computer and inviting the user to select from a normal mode and an electricity-saving mode, allowing the BIOS to execute an operating system of the computer if the normal mode is selected, stopping the BIOS temporarily if the electricity-saving mode is selected, providing the items of service so that the user to select one of the items of service, executing the driver corresponding to the selected item of service, executing the application corresponding to the selected item of service to provide service corresponding to the selected item of service and turning off the other devices, which are irrelevant to the selected item of service.

The method may include the step of defining several modes for the operation of a central processing device of the computer corresponding to the items of service. The simplified process may include the step of operating the central processing device of the computer in one of the modes corresponding to the selected item of service.

It is another objective of the present invention to provide a computer including a central processing device, a plurality of peripherals, a power supply and a switch circuit. The central processing device includes a CPU, a chip set, a memory and a BIOS chip for storing a BIOS. The peripherals are connected to the chip set. The peripherals include one for storing an operating system, an electricity-saving system, a plurality of drivers and a plurality of applications. The power supply provides electricity to the central processing device and the peripherals. The switch circuit is provided for controlling the supply of electricity to the peripherals. The BIOS loads the electricity-saving system to the memory when the power supply normally provides the electricity. The electricity-saving system provides a plurality of items of service so that a user can select one of the items of service to execute the driver and application corresponding to the selected item of service, and to turn off some of the peripherals which are irrelevant to the selected item of service via the switch circuit.

It is still another objective of the present invention to provide a computer including a central processing device, a plurality of peripherals, a power supply, a switch circuit and a plurality of buttons. The central processing device includes a CPU, a chip set, a memory and a BIOS chip for storing a BIOS. The peripherals are connected to the chip set and comprise one for storing an operating system, an electricity-saving system, a plurality of drivers and a plurality of applications. The power supply provides electricity to the central processing device and the peripherals. The switch circuit is provided for controlling the supply of electricity to the peripherals. The buttons are connected to the chip set so that one of items of service is selected and the BIOS is executed when a corresponding one of the buttons is pushed. The BIOS loads the electricity-saving system to the memory when the power supply normally provides the electricity. The electricity-saving system executes the driver and application corresponding to the selected item of service, and turns off some of the peripherals which are irrelevant to the selected item of service via the switch circuit.

Other objectives, advantages and features of the present invention will become apparent from the following description referring to the attached drawings.

BRIEF DESCRIPTION OF DRAWINGS

The present invention will be described through detailed illustration of the preferred embodiment referring to the drawings.

FIG. 3 is a table for providing definitions related to the method shown in FIG. 2.

DETAILED DESCRIPTION OF PREFERRED EMBODIMENT

Figure 1:
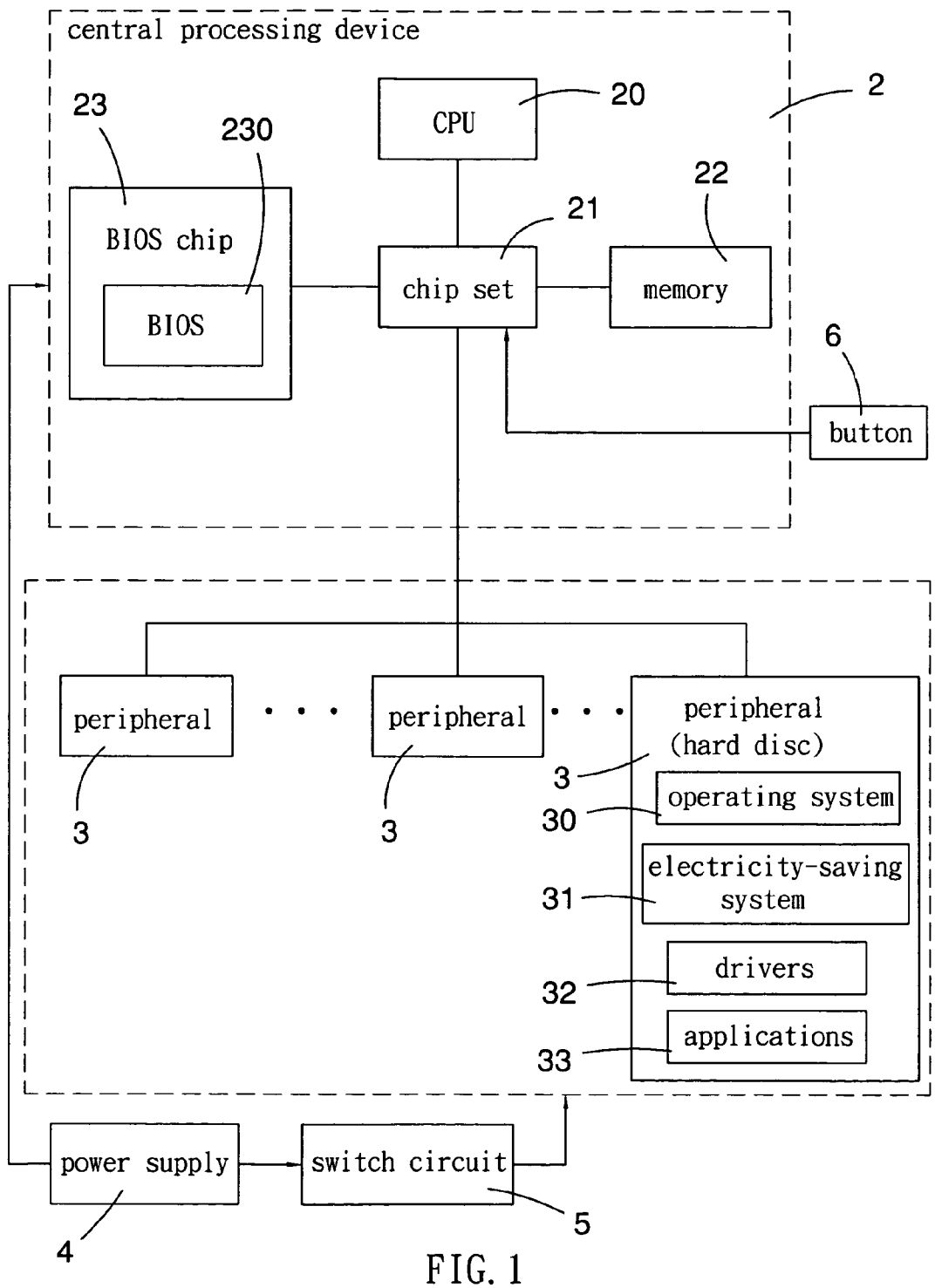
FIG. 1 is a block diagram of a computer.

Referring to FIG. 1, there is shown a computer including a central processing device 2, a plurality of peripherals 3, a power supply 4 and a switch circuit 5. The central processing device 2 includes a CPU 20, a chip set 21, a memory 22 and a BIOS chip 23. The BIOS chip 23 stores a BIOS 230. The peripherals 3 are connected to the chip set 21, and one of the peripherals 3 includes at least one hard disc, interface card non-volatile memory or any other type of storage medium for storing an operating system 30, an electricity-saving system 31, drivers 32 and applications 33. The power supply 4 provides electricity to the central processing device 2 and the peripherals 3. The switch circuit 5 has a plurality of solid state switches for controlling the supply of electricity to the peripherals 3.

Furthermore, the BIOS 230 loads either the operating system 30 or the electricity-saving system 31 to the memory 22 when the power supply 4 normally provides the electricity. The electricity-saving system 31 provides a plurality of items of service so that a user can select one of the items of service to execute the driver 32 and application 33 corresponding to the selected item of service, and to turn off some of the peripherals 3 which are irrelevant to the selected item of service via the switch circuit 5. Therefore, through the switch circuit 5 and the electricity-saving system 31, the computer can automatically turns off the power supply for the irrelevant peripherals 3 so as to save the electricity during executing the corresponding application 33 to the selected item of the service.

In FIG. 1, the computer further includes a plurality of buttons 6 (only one of them is shown) connected to the chip set 21. When one of the buttons 6 is pushed, one of the items of service is selected and the BIOS 230 is executed. The BIOS 230 loads electricity-saving system 31 to the memory 22 when the power supply 4 normally provides the electricity. The electricity-saving system 31 executes the driver 32 and application 33 corresponding to the selected item of service, and turns off some of the peripherals 3 which are irrelevant to the selected item of service via the switch circuit 5.

Additionally, the electricity-saving system 31 can further operates the CPU 20 in one of several modes corresponding to the selected item of service.

Figure 2:
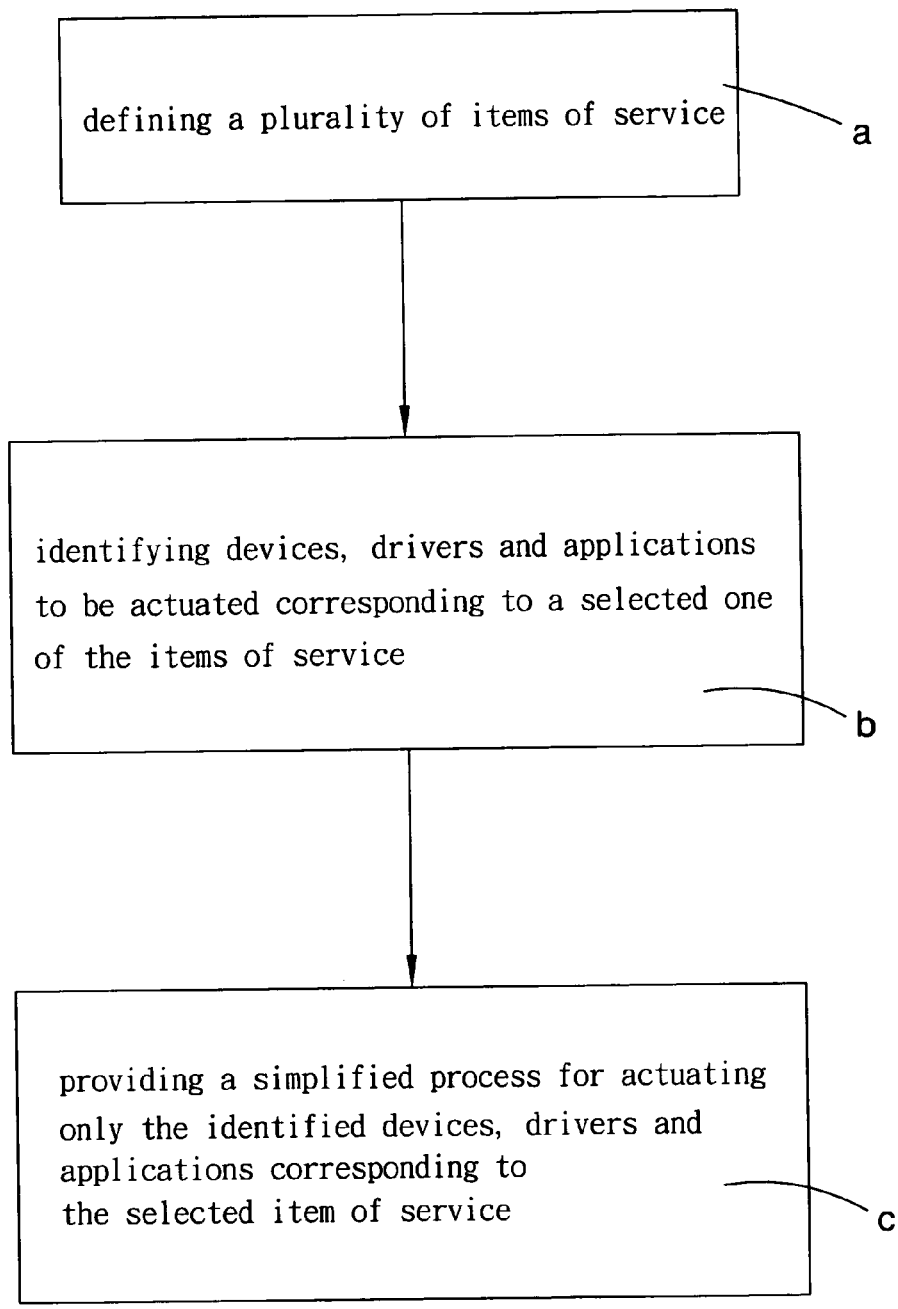
FIG. 2 is a flowchart of a method for saving electricity consumed by the computer shown in FIG. 1 according to the preferred embodiment of the present invention.

Referring to FIG. 2, there is shown a method for saving electricity consumed by the computer shown in FIG. 1 according to the preferred embodiment of the present invention. The computer comprises a plurality of devices. The method includes a step (a) of defining a plurality of items of service, a step (b) of identifying devices, drivers and applications to be actuated corresponding to a selected one of the items of service and a step (c) of providing a simplified process for actuating only the identified devices, drivers and applications corresponding to the selected item of service.

In step (a), there are defined various items of service such as music, karaoke, web-browsing, instant communication, games, movies, photograph-browsing and emails etc.

In step (b), there are identified devices, drivers and applications to be actuated corresponding to each selected one of the items of service. The definition is shown in FIG. 3. The definition is made for the computer shown in FIG. 1. The peripherals 3 include two video cards, two network cards, two IDE hard discs, a floppy disc, four SATA hard discs, eight USB ports, two serial ports, one parallel port, one PS/2 keyboard and a PS/2 mouse. These peripherals and the definition are given only for examples. In fact, other peripherals may be provided in addition and/or replacement and other definition may be given.

In step (c), there is provided a simplified process for actuating only the identified devices, drivers and applications corresponding to the selected item of service. Take the table shown in FIG. 3 for example, if "Music" is selected, only the devices related to "Music" will be actuated. Those actuated devices include the central processing device, the PS/2 keyboard, the PS/2 mouse, the first IDE hard disc, the first video card, a sound effect card and the first USB port. The other devices, which are irrelevant to "Music," are not actuated or turned off. Those not actuated devices include the second IDE hard disc, the second video card, the first and second network cards, the second to eighth USB ports, the floppy disc, the first and second serial ports, the parallel port and the first to fourth SATA discs. The drivers of the actuated devices are actuated and, more specifically, loaded to the memory of the central processing device. A multi-media program related to "Music" is executed for providing service related to "Music." This, a user of the computer can select a song and commend the computer to play the selected song through a user/device interface provided by the multi-media program.

As described above, while providing service corresponding to the selected item of service, the computer does not load the operating system to the memory of the central processing device thereof. Hence, the speed of the provision of the service is expedited and the consumption of electricity is reduced. What is more important is that only the devices corresponding to the selected item of service are actuated while the other devices, which are irrelevant to the selected item of service, are not actuated or turned off. Therefore, the consumption of electricity is further reduced. This feature and related advantages have not been disclosed in the prior art.

Figure 4:
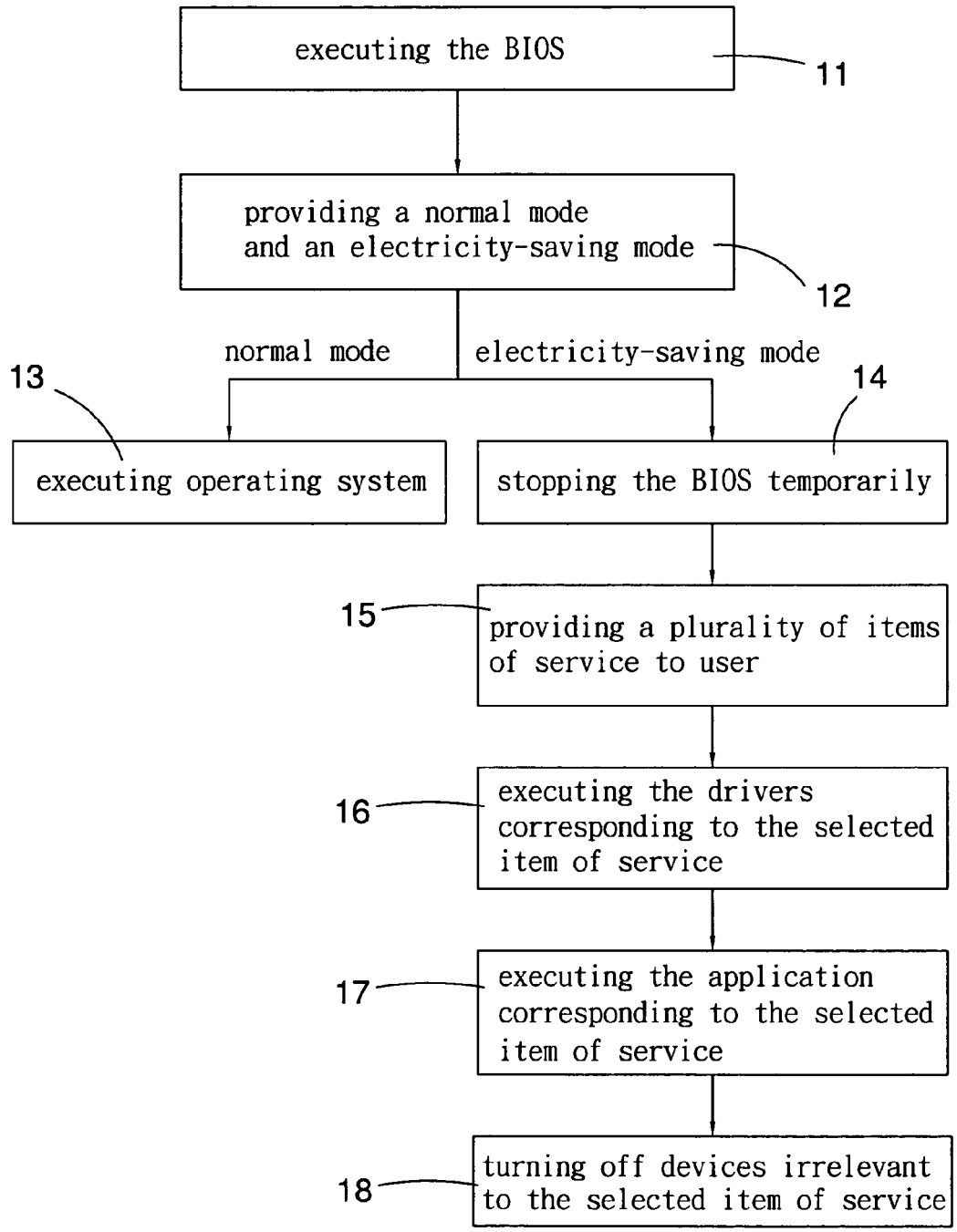
FIGS. 4 through 6 are flowcharts of various types of a simplified process of the computer.

Referring to FIG. 4, there is shown a first simplified process of the present invention.

At step 11, the BIOS is executed. After the power supply of the computer is turned on by operating a power supply switch or a reset button, an initialization signal is generated to execute the BIOS. This is a step that is always taken during the initialization of a personal computer, a laptop computer, a personal digital assistant or a mobile phone.

At step 12, after electricity is normally supplied to the devices in the computer, the BIOS provides a normal mode and an electricity-saving mode for a user to select. For example, after the BIOS completes the POST, the devices in the computer will normally receive electricity. By operating a hotkey such as "Alt" key plus "Del" key or by automatic popping-up, the BIOS provides an inquiring scene or dialogue to ask the user to select the normal mode or the electricity-saving mode.

At step 13, if the user selects the normal mode, the BIOS executes the operating system of the computer. More specifically, an operating system such as Windows XP and Linux will be loaded to the memory of the central processing device.

At step 14, if the user selects the electricity-saving mode, the BIOS will be stopped temporarily so as not to actuate the operating system of the computer. That is, no extra time and electricity will be spent on loading the operating system.

At step 15, the computer provides a plurality of items of service to the user thereof. After the user selects one from the items of service, the computer goes to step 16.

At step 16, the computer executes the drivers therein corresponding to the selected item of service. Referring to FIG. 3, if "web-browsing" is selected, a mouse/keyboard driver, an IDE hard disc driver, a video card driver, a sound effect card driver and a network card driver will be executed. Similarly, if another item of service is selected, another combination of drivers will be executed correspondingly.

At step 17, the computer executes the application therein corresponding to the selected item of service. Referring to FIG. 3, if "web-browsing" is selected, a web browser will be executed. Similarly, if another item of service is selected, another corresponding application will be executed. Unlike typical applications in need of the support of the operating system, the applications listed in the table shown in FIG. 3 are simplified. For examples, the browser listed in the table shown in FIG. 3 may be written in VB.NET or any other program languages and simplified to provide web-browsing only. Omitted are the other items of service such as "Print", "Favorites," "Search," "Tools," and "View" etc. provided by IE browser of Microsoft. Regarding emails, a simplified email system may include editing, receiving and transmitting of the emails only. The simplified applications are executed in an environment without an operating system and only occupy a small portion of the memory.

At step 18, the other devices, which are irrelevant to the selected item of service, are completely turned off. In other words, no power is supplied to the irrelevant devices. At this step, some of the devices which have been turned on at step 12 but are irrelevant to the selected item of service are turned off. For example, if "Music" is selected, the second IDE hard disc, the second video card, the first and second network cards, the second to eighth USB ports, the floppy disc, the first and second serial ports, the parallel port and the first to fourth SATA hard disc will be turned off in this step. That is, when "Music" is selected, only some of the devices in the computer corresponding to the selected item of service are turned on while the other devices, which are irrelevant, are turned off. Therefore, it can be understood that the computer, which only turns on some of the devices thereof corresponding the selected item of service, consumes less electricity according to the present than the prior art.

Furthermore, the first simplified process can further add a step of identification step, prior to step 12, for identifying whether the devices of the computer can support the proceeding for steps 14 to 18. If the identification is "true," proceeds with step 12. If the identification is "false", proceeds with step 13 directly.

Figure 5:
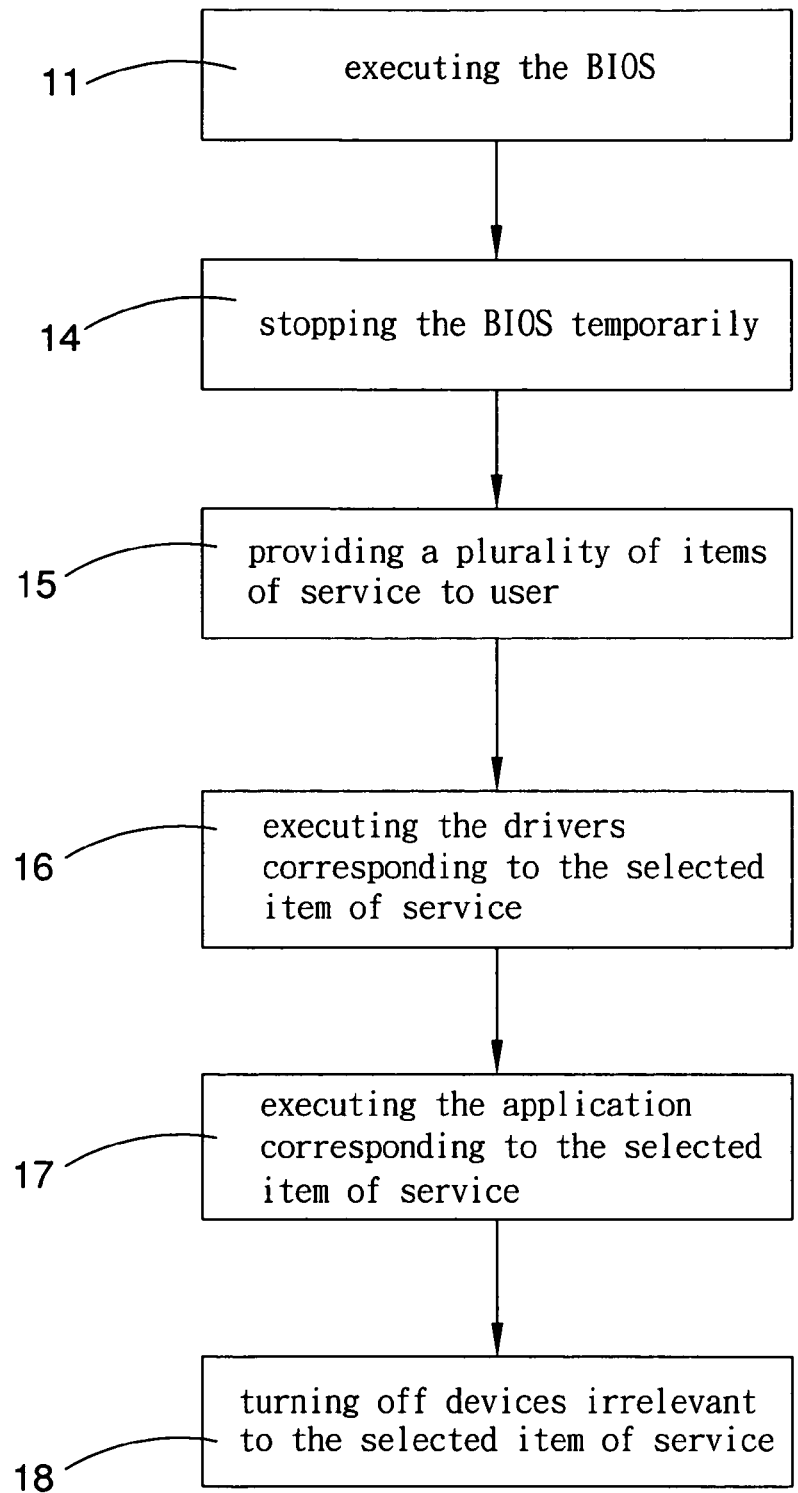

Referring to FIG. 5, there is shown a second simplified process of the present invention. The second simplified process is different from the first simplified in two aspects. Firstly, the BIOS is actuated by operating another specific switch in the second simplified process instead of the power supply switch or the reset button in the first simplified process. Since the specific switch is specifically used to actuate the computer and to enter the electricity-saving mode, steps 12 and 13 are omitted. Conclusively, the second simplified process is faster than the first simplified process.

Regarding step 15 of the first and second simplified processes, in the case where no item of service is selected, there are three ways for the computer to respond. Firstly, the BIOS turns on the operating system of the computer as shown at step 13. Secondly, the computer automatically turns off. Thirdly, the computer invites the user to select one from the above two ways.

Figure 6:
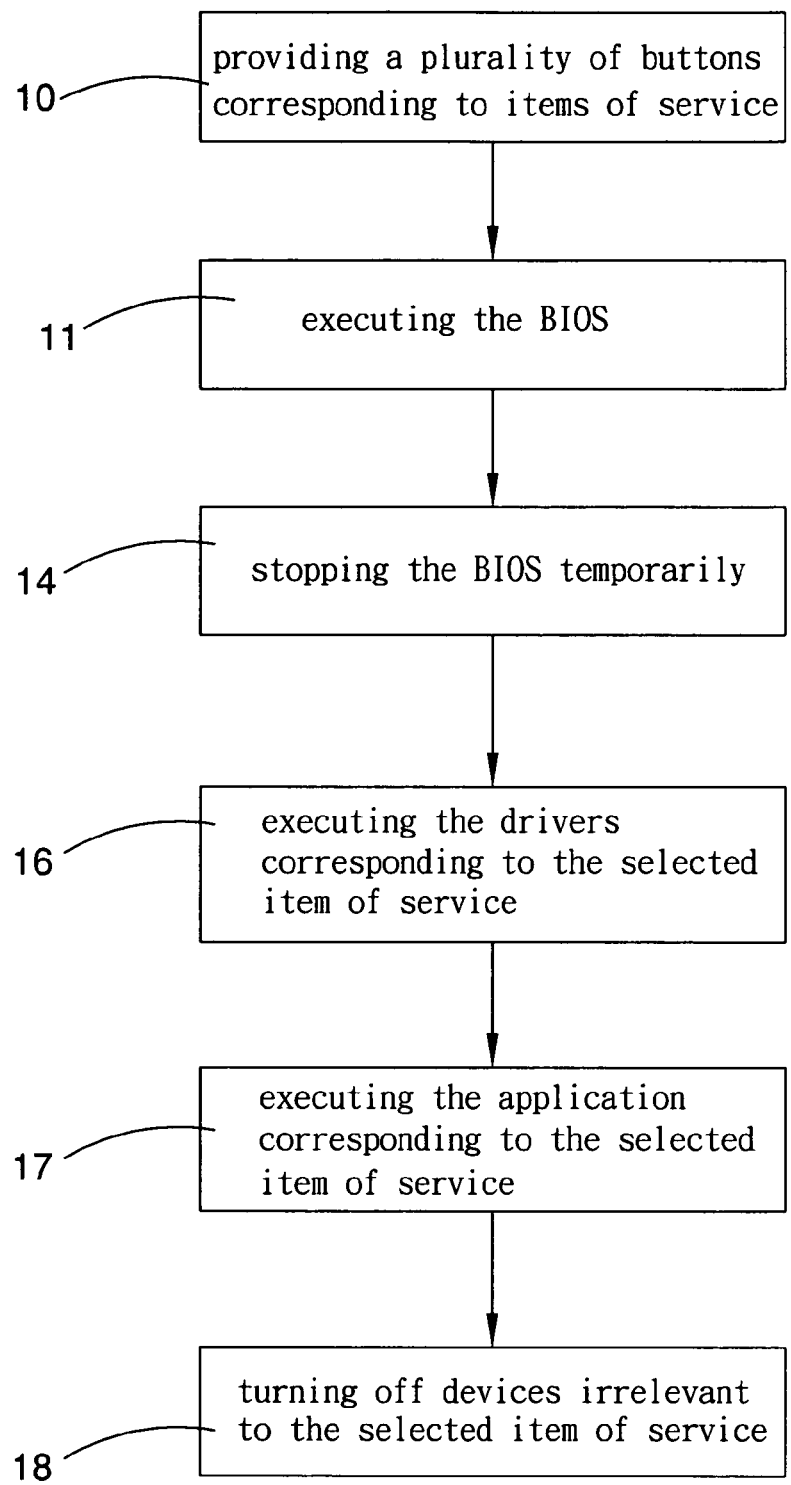

Referring to FIG. 6, there is shown a third simplified process of the present invention. In the third simplified process, the computer includes a plurality of buttons corresponding to the items of service. The user can push one of the buttons to select one of the items of service at step 10. Since one of the items of service is selected when one of several buttons is pushed, there is no need for step 15 of the first and second simplified process. Instead, if one of the buttons is pushed, the BIOS is executed at step 11. Then, the computer will stop the BIOS temporarily at step 14. Subsequently, proceeds with steps 16 through 18. The third simplified process provides service corresponding to the selected item of service faster than the second simplified process.

In the table shown in FIG. 3, there is provided information of step (b) in each of the examples. When one of the items of service is selected, the operation of the central process device can be defined. In each of the simplified processes, after step 18, the central processing device operates in one of several modes corresponding to the selected item of service. For example, the CPU and its radiating fan can operate in a full-speed mode, a high-speed mode, a medium-speed mode, a low-speed mode or an idle mode based on the consumption of electricity. Therefore, when "Music" is selected, the central processing device will operate in the low-speed mode. When "Karaoke" is selected, the central processing device will operate in the high-speed mode. When "Web-browsing" is selected, the central process device will operate in the medium-speed mode. Thus, the computer provides service while consuming a reduced amount of electricity.

In each of the simplified processes, after step 17, there are four options after the executed application ends. Firstly, the BIOS retains its operation so as to execute the operating system of the computer. Secondly, the computer automatically turns off. Thirdly, the computer returns to step 15 so as to provide the items of service for a further selection. Fourth, the computer invites the user to select one from the previous options.

The present invention has been described through the illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A method for saving electricity consumed by a computer comprising a plurality of devices, the method comprising the steps of: executing a BIOS of the computer to load an electricity-saving system without an operating system; the electricity-saving system being capable of providing a plurality of items of service for selection by a user without the use of the operating system; each of items of service corresponding to at least one device, driver and application for operation; and
   once one of items of service is selected, actuating the device, driver and application corresponding to the selected item of service; and turning off devices irrelevant to the selected item of service.

2. The method according to claim 1 further comprising a step of actuating the BIOS for loading the electricity-saving system by operating a specific switch.

3. The method according to claim 1 further comprising steps of:
   providing a plurality of buttons corresponding to the items of service so that one of the items of service is selected when a corresponding one of the buttons is pushed; and
   executing the BIOS of the computer if one of the buttons is pushed.

4. The method according to claim 1, wherein the electricity-saving system defines several modes for the operation of a central processing device of the computer corresponding to the items of service; the method further comprising a step of operating the central processing device of the computer in one of the modes corresponding to the selected item of service.

5. The method according to claim 2, wherein the electricity-saving system defines several modes for the operation of a central processing device of the computer corresponding to the items of service; the method further comprising a step of operating the central processing device of the computer in one of the modes corresponding to the selected item of service.

6. The method according to claim 3, wherein the electricity-saving system defines several modes for the operation of a central processing device of the computer corresponding to the items of service; the method further comprising a step of operating the central processing device of the computer in one of the modes corresponding to the selected item of service.

7. A computer comprising:
- a central processing device comprising a CPU, a chip set, a memory and a BIOS chip for storing a BIOS;
- a plurality of peripherals connected to the chip set; a storage medium stored with an operating system, an electricity-saving system, a plurality of drivers and a plurality of applications;
- a power supply for providing electricity to the central processing device and the peripherals; and
- a switch circuit for controlling the supply of electricity to the peripherals;
- wherein the BIOS loads either the electricity-saving system or the operating system to the memory when the power supply normally provides the electricity, wherein the electricity-saving system provides a plurality of items of service for selection by a user without the use of the operating system, and when one of the items of service is selected the peripheral, driver and application which are related to the selected item of service are actuated, and the other peripherals which are irrelevant to the selected item of service are turned off via the switch circuit.

8. The computer according to claim 7 wherein the electricity-saving system operates the CPU in one of several modes corresponding to the selected item of service.

9. A computer comprising:
- a central processing device comprising a CPU, a chip set, a memory and a BIOS chip for storing a BIOS;
- a plurality of peripherals connected to the chip set; a storage medium stored with an operating system, an electricity-saving system, a plurality of drivers and a plurality of applications;
- a power supply for providing electricity to the central processing device and the peripherals;
- a switch circuit for controlling the supply of electricity to the peripherals; and
- a plurality of buttons connected to the chip set so that one of items of service is selected and the BIOS is executed when a corresponding one of the buttons is pushed;
- wherein the BIOS loads either the electricity-saving system or the operating system to the memory when the power supply normally provides the electricity, wherein the electricity-saving system executes the peripheral, driver and application which are related to the selected item of service, and turns off the other peripherals which are irrelevant to the selected item of service via the switch circuit.

10. The computer according to claim 9 wherein the electricity-saving system operates the CPU in one of several modes corresponding to the selected item of service.

* * * * *